United States Patent [19]

Asayama et al.

[11] Patent Number: 5,291,424
[45] Date of Patent: Mar. 1, 1994

[54] DISTANCE DETECTING APPARATUS

[75] Inventors: Yoshiaki Asayama; Yasuya Kajiwara, both of Himeji, Japan

[73] Assignee: Mitsubishi Denki Kabushiki Kaisha, Tokyo, Japan

[21] Appl. No.: 751,006

[22] Filed: Aug. 28, 1991

[30] Foreign Application Priority Data

Sep. 4, 1990 [JP] Japan .................. 2-234682

[51] Int. Cl.⁵ ................................ G01B 7/04
[52] U.S. Cl. ..................... 364/561; 364/460; 348/135; 348/148
[58] Field of Search ............ 364/460, 561, 516, 517; 358/103, 88, 107, 126, 105, 125; 340/937

[56] References Cited

U.S. PATENT DOCUMENTS

| | | | |
|---|---|---|---|
| 4,111,552 | 9/1978 | Bodlaj | 364/561 |
| 4,223,387 | 9/1980 | Danielsson et al. | 364/561 |
| 4,370,724 | 1/1983 | Herbst et al. | 364/561 |
| 4,408,288 | 10/1983 | Kondo et al. | 364/561 |
| 4,591,987 | 5/1986 | Brown | 364/561 |
| 4,660,969 | 4/1987 | Sorimachi et al. | 364/561 |
| 4,689,758 | 8/1987 | Carreras | 364/561 |
| 4,729,109 | 3/1988 | Adrian et al. | 364/561 |
| 4,777,352 | 10/1988 | Moore | 364/561 |
| 4,814,896 | 3/1989 | Heitzman et al. | 358/103 |
| 4,864,395 | 9/1989 | Tajima | 364/561 |
| 4,931,937 | 6/1990 | Kakinami et al. | 364/460 |
| 4,965,439 | 10/1990 | Moore | 364/561 |
| 4,969,735 | 11/1990 | Gilligan | 358/107 |
| 5,023,712 | 6/1991 | Kajiwara . | |

FOREIGN PATENT DOCUMENTS 196412  5/1983  Japan .
159259  4/1984  Japan .

Primary Examiner—Jack B. Harvey
Assistant Examiner—Thomas Peeso
Attorney, Agent, or Firm—Sughrue, Mion, Zinn, Macpeak and Seas

[57] ABSTRACT

A distance detecting apparatus in which an operator is able to readily and accurately see to which one of a plurality of objects the distance is detected. The apparatus is able to concurrently detect the distances to a plurality of objects which exist within the field of view of the subject vehicle. To this end, the apparatus includes: a pair of first and second image sensors including a pair of optical systems for optically sensing a plurality of objects; a first memory for storing the pictures of the objects sensed by the first image sensor as first image signals; a second memory for storing the pictures of the objects sensed by the second image sensor as second image signals; a window defining device for defining a plurality of windows at specific areas of the first or second image signals; and a calculator for making image signals within the respective windows defined by the window defining device as reference signals. The calculator is operable to make a comparison between those of the first and second image signals which correspond to the reference signals, to individually calculate the distance to each object in each window. Preferably, the first and second image sensors are disposed in a vertically spaced apart relation.

4 Claims, 4 Drawing Sheets

DISTANCE DETECTING APPARATUS

BACKGROUND OF THE INVENTION

The present invention relates to a distance detecting apparatus for optically measuring the distance from a vehicle to an object such as an obstacle, a preceding vehicle, etc., lying ahead thereof.

Some typical examples of such a distance detecting apparatus are disclosed in Japanese Patent Publication Nos. 63-38085 and 63-46363. The apparatuses disclosed therein commonly have a pair of first and second parallel optical systems having two convex lenses 101, 102 disposed in a horizontally aligned relation at a prescribed distance L away from each other, as shown in FIG. 5. A pair of separate image sensors 103, 104 are horizontally disposed at focal points of the lenses 101, 102 apart their focal distance f from the locations of corresponding lenses 101, 102, respectively, for generating respective image signals to a common signal processor 120. The signal processor 120 successively shifts the image signals from the image sensors 103, 104 and electrically superposes them one over the other, so that the perpendicular distance R from the lenses 101, 102 to an object 121 is calculated based on the principle of triangulation using the following formula:

$$R = (f \times L)/d$$

where d is a shift distance by which the image signals are moved to obtain the best match.

With the above-described conventional distance detecting apparatus as constructed above, however, if there are many objects within the field of view of the image sensors 103, 104, it is unclear to which object the distance from the subject vehicle is being detected. In particular, let us assume that the distance to an object in the form of a preceding vehicle is detected by the above-described distance detecting apparatus mounted on the subject vehicle during the travel thereof. In this, case, if another vehicle travelling on a lane of a road adjacent the one on which the subject vehicle is travelling comes into the field of view of the subject vehicle, it is not clear at all or the driver cannot tell to which vehicle (i.e., travelling on the same lane or on an adjacent lane) the distance is detected.

SUMMARY OF THE INVENTION

Accordingly, the present invention is intended to overcome the above-mentioned problem encountered with the conventional distance detecting apparatus.

An object of the present invention is to provide a novel and improved distance detecting apparatus in which an operator is able to readily and accurately see to which one of a plurality of objects the distance is detected.

Another object of the present invention is to provide a novel and improved distance detecting apparatus which is able to concurrently detect the distances to a plurality of objects which exist within the field of view of the subject vehicle.

In order to achieve the above objects, according to present invention, there is provided a distance detecting apparatus comprising:

a pair of first and second image sensors including a pair of optical systems for optically sensing a plurality of objects;

a first memory for storing the pictures of the objects sensed by the first image sensor as first image signals;

a second memory for storing the pictures of the objects sensed by the second image sensor as second image signals;

window defining means for defining a plurality of windows at specific areas of the first or second image signals;

a calculator for making image signals within the respective windows defined by the window defining means as reference signals, the calculator being operable to make a comparison between those of the first and second image signals which correspond to the reference signals, to individually calculate the distance to each object in each window.

Preferably, the first and second image sensors are disposed in a vertically spaced apart relation.

A display having a screen may be provided on which the windows defined by the window defining means are displayed. Preferably, the window defining means defines the plurality of windows in such a manner that the windows are displayed on the screen of the display in a horizontally separate relation.

The above and other objects, features and advantages of the invention will become more readily apparent from the following detailed description of a preferred embodiment thereof taken in conjunction with the accompanying drawings.

DESCRIPTION OF THE PREFERRED EMBODIMENT

A preferred embodiment of the present invention will now be described in detail with reference to the accompanying drawings.

Figure 1:
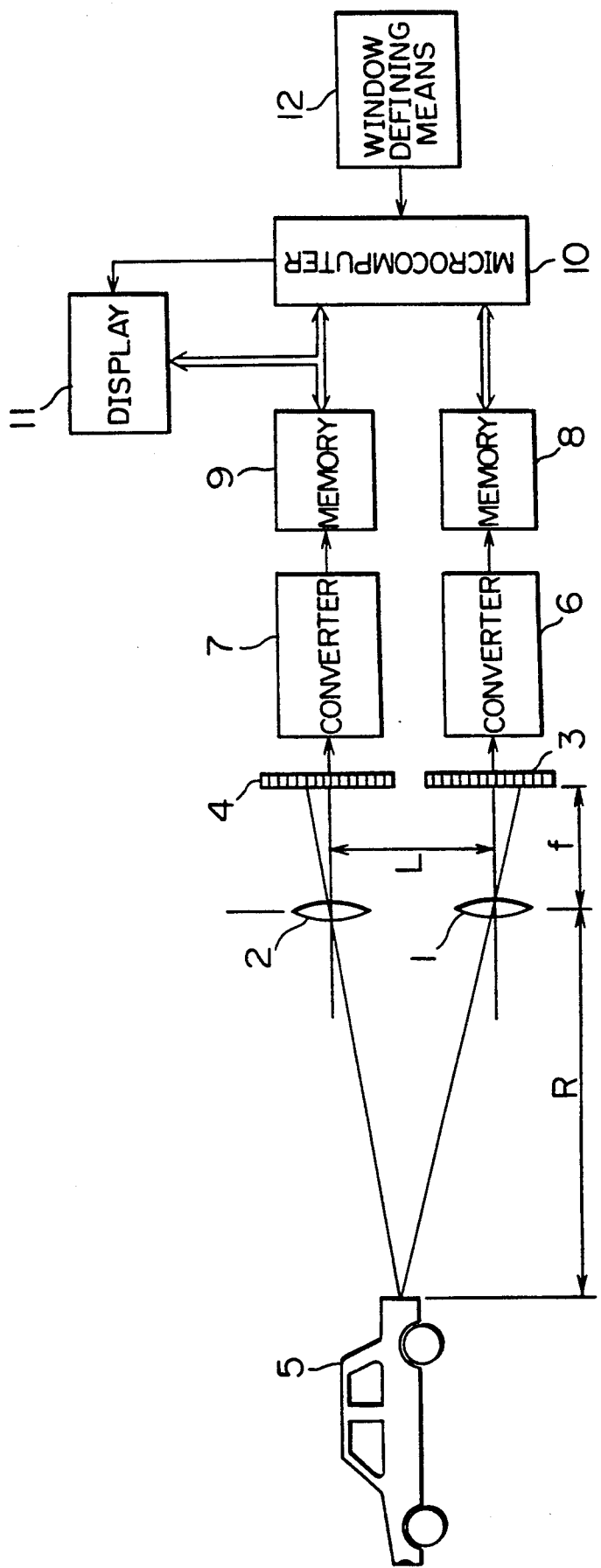
FIG. 1 is a schematic block diagram showing the general arrangement of a distance detecting apparatus in accordance with the present invention.

FIG. 1 illustrates, in a block diagram, the schematic arrangement of a distance detecting apparatus which is constructed according to the principles of the invention and which is mounted on a vehicle for detecting the distances to preceding vehicles running ahead (in front) of the subject (driving) vehicle.

Figure 2:
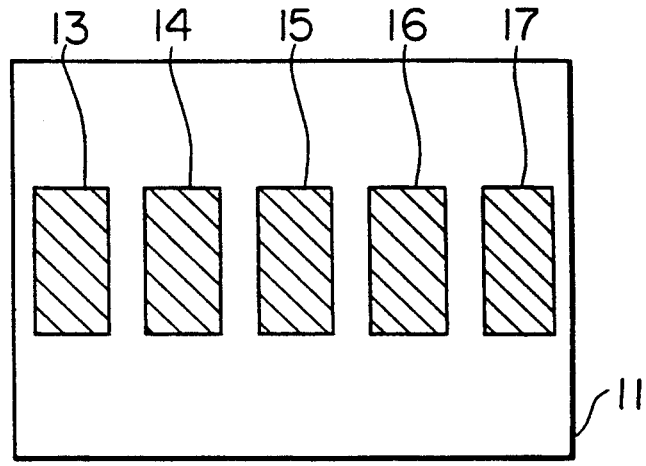
FIG. 2 is an explanatory view showing a plurality of windows defined on the screen of a display.

The apparatus illustrated includes a pair of first and second parallel optical systems having two convex lenses 1, 2 disposed in a vertically aligned relation at a prescribed distance L away from each other, and a pair of separate first and second (e.g., upper and lower) image sensors 3, 4 which are vertically or otherwise disposed at focal points of the lenses 1, 2, respectively, at a distance f from the locations of the corresponding lenses 1, 2 for generating first and second image signals each in the form of an analog signal representative of a two-dimensional image, which are input to a pair of corresponding first and second analog-to-digital (A/D)

converters 6, 7. The outputs of the A/D converters 6, 7 are input to a pair of corresponding first and second memories 8, 9 and stored therein. A calculator 10 in the form of a microcomputer performs data transfer with the memories 8, 9 as well as various calculations and determinations based on the data stored in the memories 8, 9. A display 11 having a screen is connected to the first and second memories 8, 9 and the microcomputer 10 for displaying a picture sensed by the first or second image sensor 8, 9 on the screen. The operation of the display 11 is controlled by the microcomputer 10. A window defining means 12 is connected to the microcomputer 10 for defining on the screen of the display 11 a plurality of windows which can be utilized for designating a plurality of objects for distance measurements. More specifically, as shown in FIG. 2, the driver of a vehicle can manipulate the window defining means 12 to define a plurality (e.g., five in the illustrated embodiment) of windows 13 through 17 on the screen of the display 11 at horizontally spaced or separate predetermined specific locations thereof while looking at the screen.

Figure 3:
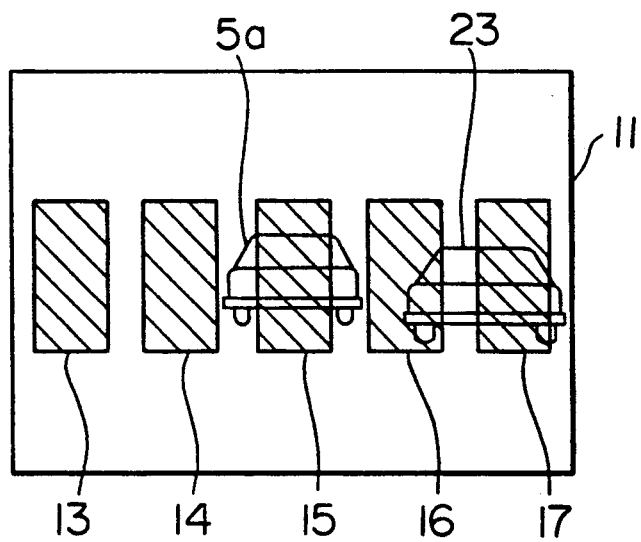
FIG. 3 is an explanatory view showing that a plurality of preceding vehicles running ahead of a vehicle come into some of the windows.

The operation of the above-described apparatus will be described below while referring to FIGS. 2, 3 and 4(a) and 4(b). First, assume that the picture of an object in the form of a preceding vehicle 5a ahead of the subject vehicle is sensed by the second or upper image sensor 4 and digitized by the second A/D converter 7 and then displayed on the screen of the display 11 within the images stored in the second memory 9, as shown in FIG. 3. In this case, the microcomputer 10 reads out from the second memory 9 picture element signals within the window 15 that catches the preceding vehicle 5a, to make them as reference image signals, which are used as a basis for calculating the distance to the vehicle 5a. Then, the microcomputer 10 selects a specific area corresponding to the window 15 from the first memory 8, which stores image signals of pictures sensed by the first or lower image sensor 3. Then, the microcomputer 10 calculates a total sum of the absolute values of the differences between the corresponding image signals for the first and second picture elements stored in the first and second memories 8, 9 while vertically shifting the image signals from the first memory 8 relative to the above defined reference picture signals in a stepwise manner one picture element by one picture element. In other words, by sequentially shifting the first memory image signals one picture element by one picture element, the best position of the imaged picture of the object 5a in the first memory 8 is determined in which the imaged picture in the first memory 8 best matches the reference picture. Thus, the amount of shift or shift distance of the first memory picture relative to the reference picture is calculated which minimizes the total sum of the absolute values of the differences.

Figure 4A:
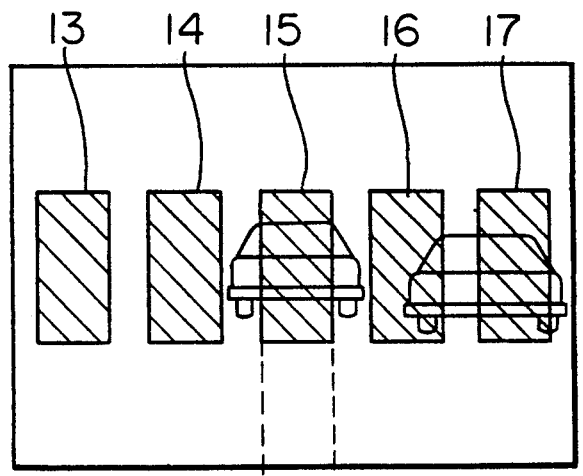
FIGS. 4(a) and 4(b) are explanatory views showing image areas to be compared with reference images each within a corresponding window.
Figure 4B:
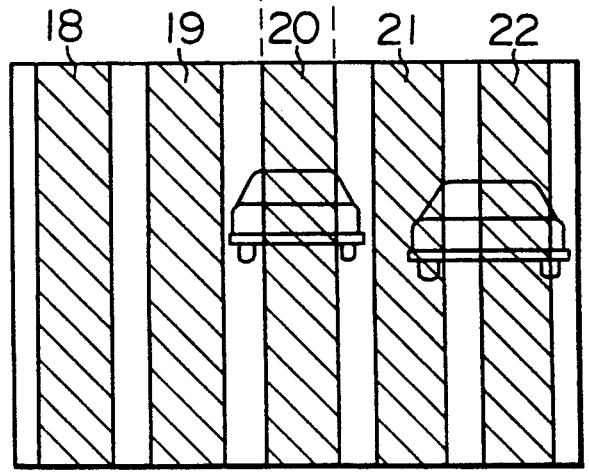
Figure 5:
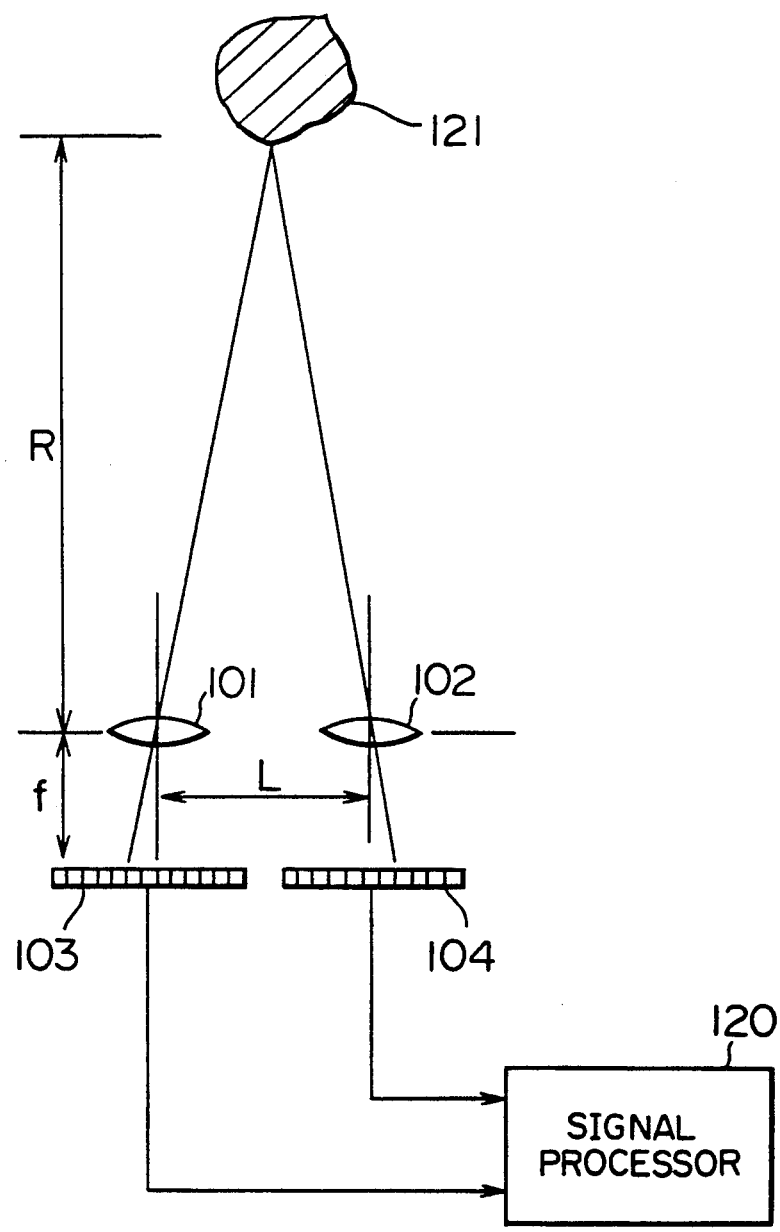
FIG. 5 is a block diagram showing the general arrangement of a conventional distance detecting apparatus.

In this connection, it is to be noted that the area in the first memory 8 relating to the above calculation is a vertically extending band area 20, as shown in FIG. 4(b), which corresponds to the position of the window 15 in which the reference picture exists, as shown in FIG. 4(b).

With the use of the amount of shift n in terms of the number of picture elements as calculated above, the distance R to the preceding vehicle 5a is calculated as follows:

$$R = (f \times L)/nP \tag{1}$$

where f is the focal distance of the first and second lenses 1, 2; L is the distance between the centers of the first and second lenses 1, 2; n is the amount of shift represented by the number of picture elements for minimizing the total sum of the absolute values of the differences between the first and second picture elements in the first and second memories 8, 9; and P is the vertical pitch between adjacent picture elements in a vertical array.

In this manner, the distance R to the object 5 imaged in the window 15 can be measured. Likewise, if another vehicle 23 running on an adjacent lane of the road ahead of the subject vehicle comes into the fields of view of the image sensors 3, 4 and if it is caught by the image sensors 3, 4 and displayed on the screen of the display 11 inside the window 17, as illustrated in FIG. 3, the microcomputer 10 makes the image signals inside the window 17 as reference picture signals as shown in FIG. 4(a), selects an image area 22 in the first memory 8 corresponding to the image signals of the second memory 9 inside the window 17, and determines the position of the imaged picture in the first memory 8 which provides a best match with the picture inside the window 17. Then, using equation (1) above, the distance to the other preceding vehicle 23 is calculated in the same manner.

In this manner, even in cases where there are a plurality of preceding vehicles running ahead of the subject vehicle, it is possible to concurrently detect the distances to the respective preceding vehicles.

As can be seen from the foregoing, the objects caught by the plurality of windows 13 through 17 defined on the screen of the display 11, as shown in FIG. 4(a), are compared with the imaged pictures thereof in the calculation areas of the memory 8 corresponding to the windows 13 through 17, respectively, as shown in FIG. 4(b), whereby the distances to the respective objects can substantially and concurrently be measured using the individual windows 13 through 17.

Although in the above description, five windows 13 through 17 are exemplarily set and shown, the number of windows can arbitrarily be varied in accordance with the size or dimensions of objects within the fields of view of the image sensors as well as the number of objects to which distance measurements are required.

In addition, the size and shape of each window can also be varied optionally depending on the objects to be measured, and hence the invention is not limited to those which are described and shown in relation to the above embodiment.

What is claimed is:

1. A distance detecting apparatus comprising:
   a pair of first and second image sensors each including an optical system for optically sensing a plurality of individual objects and producing respective image pictures thereof;
   a first memory for storing the image pictures of the plurality of objects sensed by said first image sensor as first image signals;
   a second memory for storing the image pictures of the plurality of objects sensed by said second image sensor as second image signals;
   window defining means for concurrently defining a plurality of individual, spaced windows at specific areas of the first and second memories;
   an image display for simultaneously displaying the plurality of individual, spaced windows and the plurality of objects sensed by one of the first and second image sensors, and stored in a corresponding one of the first and second memories; and a calculator device for selecting image signals within the respective windows defined by said window defining means as reference signals, said calculator device comparing the reference signals to the first or second image signals which correspond to the reference signals, to individually and simultaneously calculate the distances to the plurality of objects displayed in said windows.

2. A distance detecting apparatus according to claim 1, wherein said first and second image sensors are disposed in a vertically spaced apart relation.

3. A distance detecting apparatus according to claim 2, wherein the image display has a screen on which the windows defined by said window defining means are displayed.

4. A distance detecting apparatus according to claim 3, wherein said window defining means defines the plurality of windows in such a manner that the windows are displayed on the screen of said display in a horizontally spaced and separate manner.

* * * * *